J. T. Elliott,
Cotton Press,
No. 7731,  Patented Oct. 22, 1850.
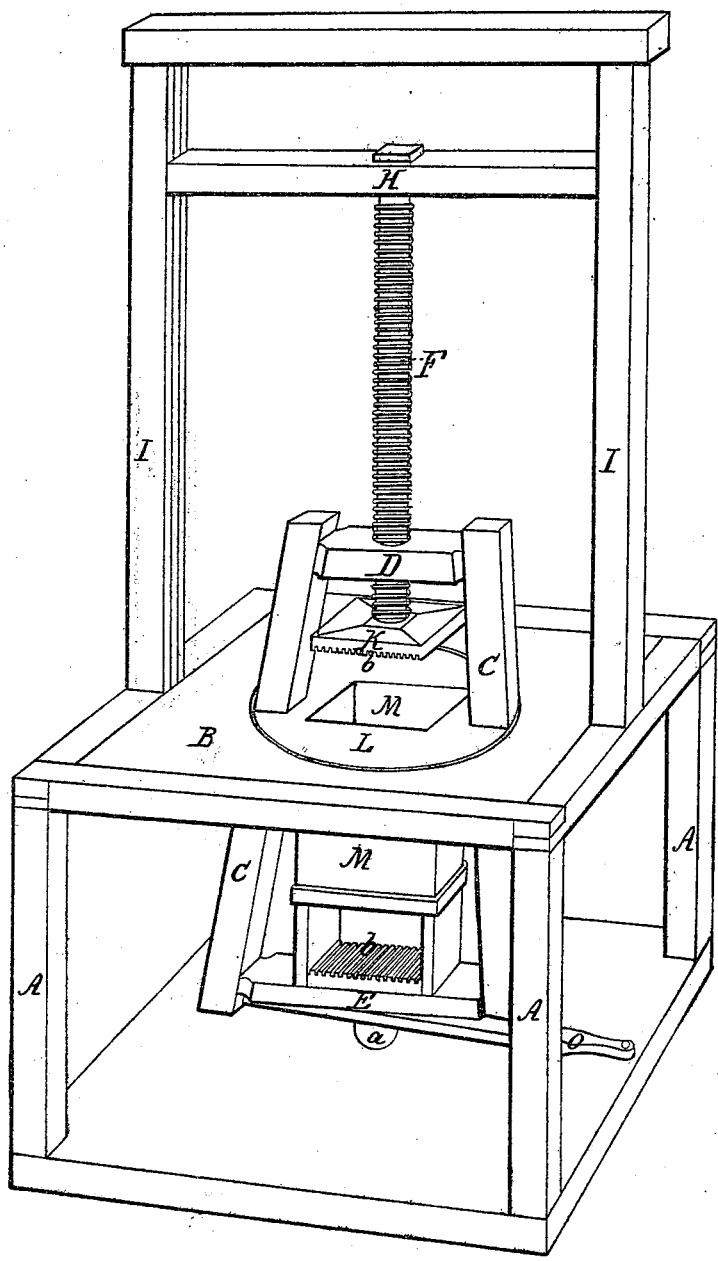

UNITED STATES PATENT OFFICE.

J. T. ELLIOTT, OF CARROLLTON, MISSISSIPPI.

IMPROVEMENT IN COTTON-PRESSES.

Specification forming part of Letters Patent No. 7,731, dated October 22, 1850.

*To all whom it may concern:*

Be it known that I, J. T. ELLIOTT, of Carrollton, in the county of Carroll and State of Mississippi, have invented certain new and useful Improvements in Presses for Compressing Cotton and other Substances, of which the following is a specification.

My press is constructed to receive the cotton from the floor of the lint-room and to deliver it on the ground-floor. The power used, being that of animals, is applied directly to the lower part of the press-frame, which, together with the cotton-box, is turned, while the screw to whose lower extremity the follower is attached is prevented from turning by a cross-head, to which its upper extremity is secured, and which rises and falls in guides as the press-frame is turned in one direction or the other.

In the drawing, A A are the posts of the gin-house, which support the floor B of the lint-room. A step is secured to the ground-floor of the building, which receives the gudgeon of the press-frame. The latter is composed of two upright gallows-posts, C, connected at their upper and lower extremities by horizontal press-beams D E, the whole being strongly framed together. This press-frame is constructed to revolve on a gudgeon secured to the lower press-beam, E, and resting in the step *a* on the ground-floor. The upper press-beam is fitted with the nut of the press-screw F. The latter, being passed through the nut, is secured at its upper extremity to a cross-head, H, the extremities of which are fitted in grooves formed in two parallel upright guide-posts, I I, secured to the frame of the building. The lower extremity of the screw is connected with the follower K. The press-frame extends through the lint-room floor, in which a circular opening is made large enough to allow the frame to turn freely. A circular floor, L, is loosely fitted to this opening, and is secured to the press-frame. In the center of this floor an opening is made through which the cotton is charged into the box M. The latter is upright, and extends downward from the circular floor to the lower press-beam, E, the lower portions of its sides being made removable to facilitate the baling and removing of the compressed cotton. That part of the lower press-beam beneath the follower, and the follower itself, are both fitted with cleats *b*, separated by spaces through which the bale-rope is inserted. The lower press-beam, E, has an arm, O, projected laterally from it to support the whiffletree to which the animal is hitched, and by which a sufficient leverage is obtained to compress the cotton.

When the press is to be put in action, the whole press-frame, with the cotton-box M and circular floor L, is turned until the screw F (which is prevented from turning by the cross-head H) is worked up by the nut (which turns with the upper press-beam, D,) sufficiently to raise the follower K to its highest position. The motion of the press-frame is then stopped, and the loose cotton is charged into the cotton-box. The press-frame is now turned by the animal hitched to the arm O in a direction to work the screw down by the nut turning with the upper press-beam. The follower, being thus forced down, enters the cotton-box, and as the animal continues to walk round in a circle the cotton is compressed by the descending follower. The operation is continued until the cotton in the box is compressed into a bale of the requisite size, which is bound in the usual manner. The motion of the press-frame is then reversed, and the bale being removed the follower is raised as at first to receive a fresh charge.

In order to decrease the friction of the cross-head in the guide-grooves, friction-wheels may be applied to its extremities which will run upon guides. In the machine thus far described no means are shown for guiding the follower into the mouth of the cotton-box, and hence this must be effected by hand; but in some cases it may be expedient to add a pair of guides to the upper part of the press-frame to keep the follower in a proper position for entering the mouth of the cotton-box.

By constructing a cotton-press in the manner above set forth with a turning press-frame instead of a turning screw, the lever to which the power is applied is always at the same distance from the ground, and always revolves in the same plane; hence the building in which the press is placed can be much lower, and can be constructed with an intermediate floor, which must be omitted when the lever is attached to the head of the screw, as in this case its upper extremity rises and falls with the screw, while its lower extremity must be near enough to the ground for a horse to be hitched to it. The room saved by dispensing with a lever arranged in this manner is considerable, while at the same time the construction of my press enables me to insert it through the floor of the lint-room, where it can be conveniently charged with the raw cotton.

What I claim as my invention, and desire to secure by Letters Patent, is—

The employment of the press herein described, so arranged that it may be conveniently charged in an upper story of the building in which it is placed and actuated and uncharged in a lower story of the same, substantially as herein set forth.

In testimony whereof I have hereunto subscribed my name.

J. T. ELLIOTT.

Witnesses:
A. S. WOODSON,
H. H. SOUTHWORTH.